United States Patent

[11] 3,601,352

| [72] | Inventors | Peter L. Jensen<br>Livonia;<br>Richard H. Miller, Wayne, both of, Mich. |
|---|---|---|
| [21] | Appl. No. | 790,642 |
| [22] | Filed | Jan. 13, 1969 |
| [45] | Patented | Aug. 24, 1971 |
| [73] | Assignee | Ford Motor Company<br>Dearborn, Mich. |

[54] BREAKAWAY REARVIEW MIRROR MOUNTING ASSEMBLY
13 Claims, 6 Drawing Figs.

[52] U.S. Cl. .................................................. 248/481,
248/288, 248/475, 248/484, 287/12, 287/87
[51] Int. Cl. .................................................. B60r 1/04
[50] Field of Search ......................................248/481–484,
479, 480, 485–487, 276, 278, 288,
181; 287/12, 87

[56] References Cited
UNITED STATES PATENTS

| 2,326,495 | 8/1943 | Reenstierna.................. | 287/12 X |
| 2,427,411 | 9/1947 | Krueger........................ | 287/12 UX |
| 2,929,600 | 3/1960 | Malachowski................ | 287/87 X |
| 2,971,436 | 2/1961 | Smith............................ | 248/483 |
| 3,367,616 | 2/1968 | Bausch et al................. | 248/483 |

Primary Examiner—Roy D. Frazier
Attorneys—John R. Faulkner and E. Dennis O'Connor ABSTRACT: A mounting assembly for releasably securing a rearview mirror to motor vehicle body structure. The mirror is operatively secured to the body structure by an elongate frangible member adapted to fracture upon an impact load being applied to the mirror. Also, the mirror is interconnected with the body structure by a friction coupling that allows manual mirror position adjustment. Means are provided to preload the frangible member in tension and to adjust the friction force present at the friction coupling.

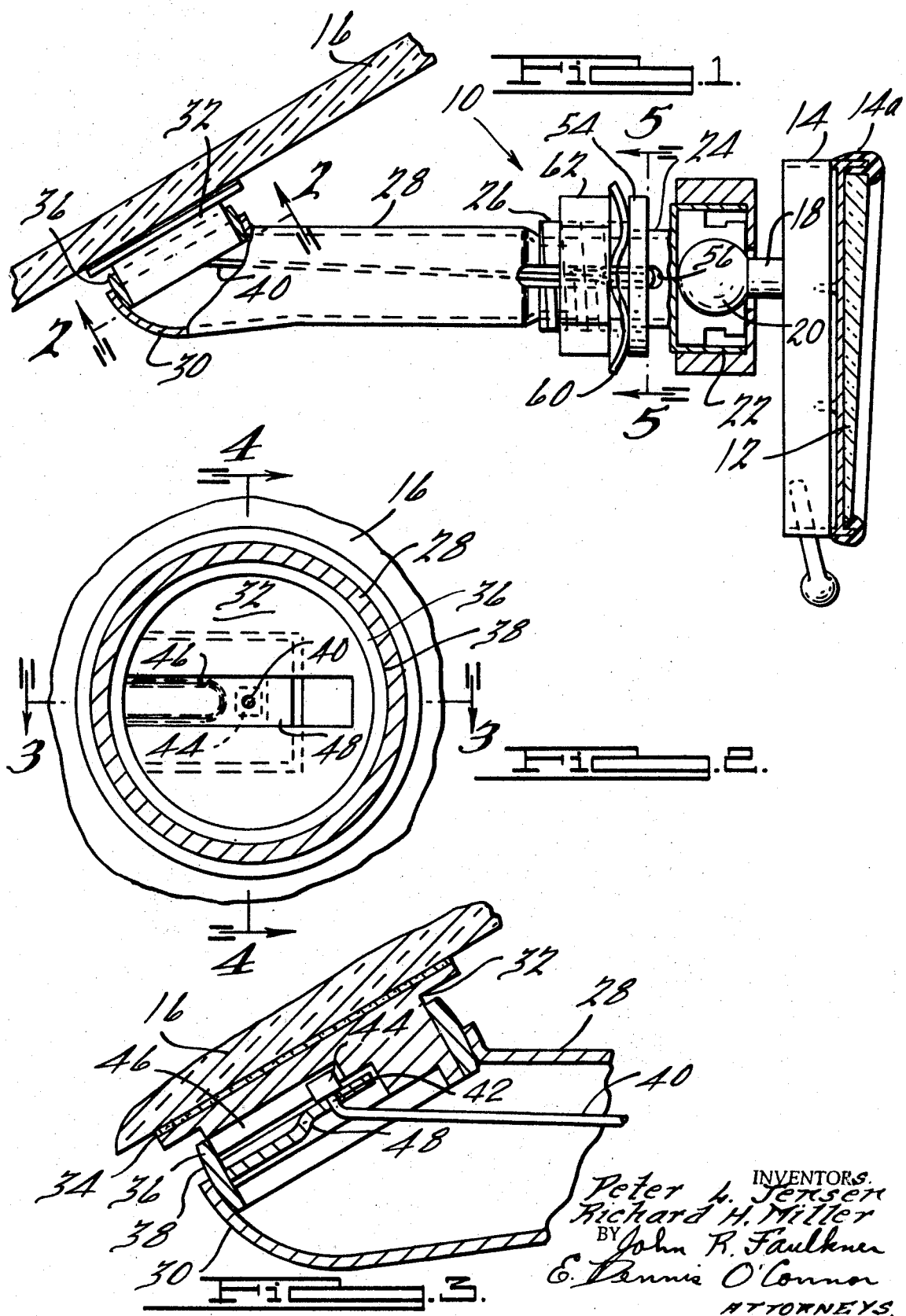

INVENTORS.
Peter L. Jensen
Richard H. Miller
BY
John R. Faulkner
E. Dennis O'Connor
ATTORNEYS.

BREAKAWAY REARVIEW MIRROR MOUNTING ASSEMBLY

BACKGROUND OF THE INVENTION

A commonly used scheme for attaching a motor vehicle rear view mirror to adjacent body structure, such as a windshield or windshield header, is so-called "double-coupling" mounting assembly. This arrangement utilizes an elongate mirror stem secured at one of its ends to the mirror housing by means of a first universal movement coupling. The mirror stem is secured at the other of its ends by means of a second universal movement coupling to a mounting button attached to the body structure. These universal couplings often comprise ball and socket connections.

It is advantageous to include two such couplings in a mirror-mounting assembly to provide optimum mirror position adjustment capabilities. The coupling proximate the mirror may be used for fine adjustments, such as relate to the angular orientation of the mirror. The coupling remote from the mirror, that causes large mirror movement corresponding to a relatively small coupling adjustment, may be used for coarse mirror position adjustments, such as varying the height of the mirror to suit the physical dimensions of a particular vehicle operator.

The frictional forces present in these ball and socket connections conventionally may be varied by adjustment of a setscrew incorporated into the coupling design. This feature may give rise to an undesirable inconvenience to the operator, especially relative to the coupling located remote from the mirror. The weight of the mirror and its housing, acting over the length of the elongate mirror stem, causes a large moment tending to cause movement in the coupling remote from the mirror and consequent deviation of the mirror from the desired position. This moment must be compensated for by the friction forces in the ball and socket connection.

If this moment, compounded by normal vehicle operating vibrations, causes a loosening in the coupling, it may be necessary to adjust the setscrew to tighten the coupling so that the mirror may be held in the proper position. Such an adjustment cannot be accomplished unless the vehicle is brought to a halt; and then only if a screwdriver fitting this setscrew is available.

Also, it has been demonstrated by the prior art that so-called "breakaway" rearview mirror mounting assemblies oft times are desirable. A breakaway mount for a mirror contemplates that the mirror will become disconnected from the vehicle body structure to which it is secured when an impact force exceeding a predetermined magnitude is applied to the mirror or attendant structure.

It is an object of this invention to provide a rearview mirror mounting assembly of the double-coupling type that allows optimum mirror adjustment characteristics but wherein the coupling remote from the mirror may be adjusted simply and at any time by the vehicle operator. Furthermore, the mirror-mounting assembly of this invention will allow for a disconnection of the mirror from the vehicle body structure to which it normally is attached upon an impact of predetermined magnitude being applied to the mirror or its housing.

SUMMARY OF THE INVENTION

A rearview mirror mounting assembly constructed in accordance with this invention is adapted to releasably secure a rearview mirror to motor vehicle body structure and includes an elongate member operatively secured to the mirror. A projection is secured to the body structure. A sleeve having a nonuniform cross section is secured to the elongate member and is adapted to receive the projection in frictional engagement. Manually operative adjustment means are secured to the elongate member and the projection and are capable of urging the sleeve towards and away from the projection to vary the frictional forces therebetween. These adjustment means include a slidable member relatively movable along the length of the elongate member, a rod having one of its ends secured to the projection and the other of its ends secured to the slide member to position the latter at a predetermined distance from the former and torque means operatively bearing on the sliding member and capable of being positioned at a plurality of locations along the length of the elongate member. The rod is constructed of frangible material and has along its length a predetermined point of weakened structural integrity that constitutes a break point. Upon an impact force of a predetermined magnitude being applied to the mirror or attendant structure, the frangible rod will fracture at this break point and allow the mirror and its mounting assembly to become disconnected from the body structure.

DESCRIPTION OF THE DRAWINGS

FIG. 1 is a side elevation view, partially in section, of the rearview mirror mounting assembly of this invention;

FIG. 2 is an enlarged sectional view taken along the line 2—2 of FIG. 1;

FIG. 3 is a sectional view taken along the line 3—3 of FIG. 2;

DETAILED DESCRIPTION OF THE INVENTION

Figure 4:
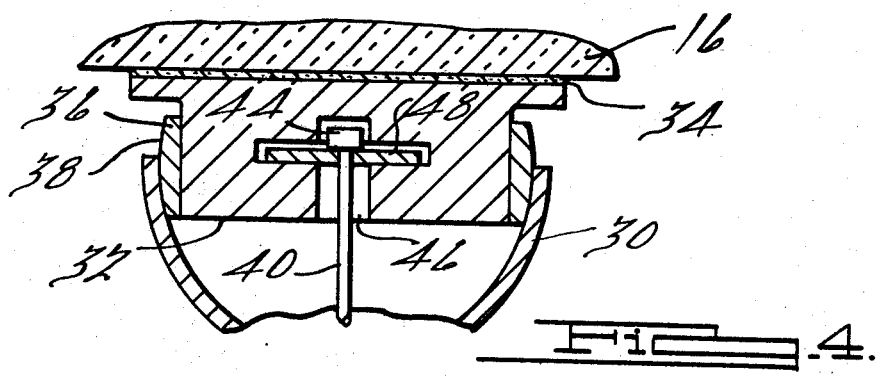
FIG. 4 is a sectional view taken along the line 4—4 of FIG. 2.

Referring now in detail to the drawings, the numeral 10 denotes a rearview mirror-mounting assembly for releasably securing a rearview mirror to motor vehicle body structure such as a windshield 16. A conventional prismatic mirror 12 is mounted in a mirror housing 14. The mirror housing may be covered with energy-absorbing material as denoted at 14a. Secured to and protruding from housing 14 is a stud 18 having a ball 20 formed on the end thereof remote from housing 14. Ball 20 is received within a coupling member 22 that cooperates with ball 20 to form a ball and socket connection.

Figure 6:
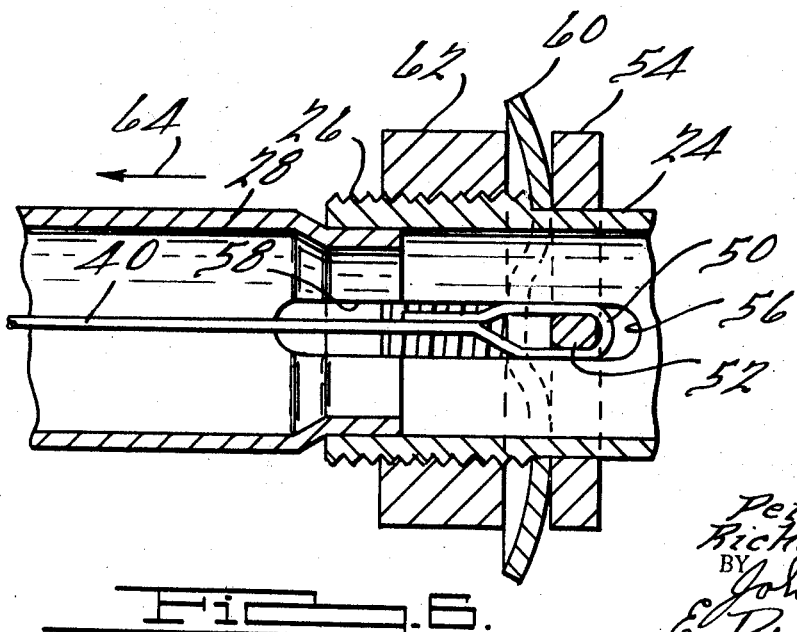
FIG. 6 is a sectional view taken along the line 6—6 of FIG. 5.

As best may be seen from FIGS. 1 and 6, a sleeve or arm portion 24 is secured to housing 22 and protrudes therefrom. The end of sleeve 24 remote from housing 22 has external threads 26 formed along a portion of the length thereof. Secured to the threaded end of sleeve 24 is a second sleeve or arm portion 28. As illustrated in the drawings, sleeve 28 is telescopically received within the sleeve 24 in a pressed fit. However, as is obvious to one having skill in the art, sleeves or arm portions 24 and 28 may be unitary.

Referring now to FIGS. 2 to 5, it may be seen that the end 30 of sleeve 28 remote from sleeve 24 has formed thereon an end portion that is angularly divergent from the main axis of sleeve 28. A mounting button or projection 32 permanently is secured to windshield 16 by any conventional means such as adhesive 34. Button 32 has a circular cross section and is surrounded by a bearing member 36. The outer surface 38 of bearing member 36 is slightly arcuate and is adapted to be received in telescoping relationship within end 30 of sleeve 28. Button 32, bearing member 36 and end 30 comprise friction means to generally maintain the relative position of sleeve 28 and button 32, but to permit manual adjustment of the sleeve 24 when desired.

Sleeve 28 is constructed of material, such as thin sheet, that may be elastically deformed. It thus readily may be appreciated that the interference fit of bearing member 36 within end 30 of sleeve 28 comprises a friction fit. This friction fit allows universal movement of sleeve 28 about bearing member 36 by overcoming the force of friction holding these two members together. This feature of the invention will be dealt with further below.

A rod 40 has one end 42 thereof angularly offset from the longitudinal axis of the rod. End 42 has formed thereon an enlargement 44. Enlargement 44 is positioned in a T-shaped slot 46 formed in the mounting button 32 (FIGS. 3 and 4). Angularly offset rod portion 42 extends through an aperture in a lock plate 48 that also is positioned in slot 46 (in the transverse portion of this slot).

Figure 5:
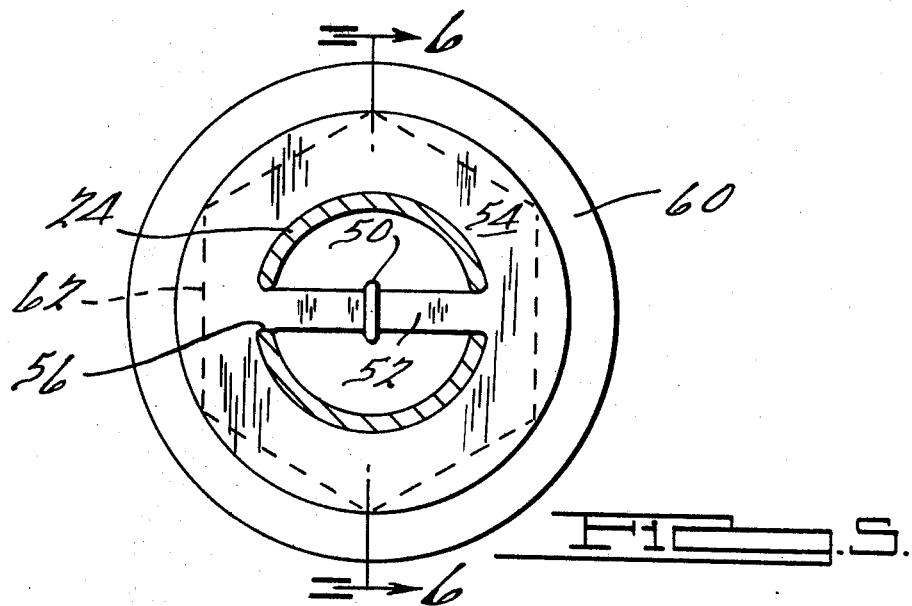
FIG. 5 is an enlarged sectional view taken along the line 5—5 of FIG. 1.

Referring now to FIGS. 5 and 6, it may be seen that the end of rod 40 remote from mounting button 32 has a loop 50 formed therein. This loop engages a web 52 extending across the centraL aperture of a slidable washer 54. Washer 54 is positioned on sleeve 24 and may slide freely along sleeve 24 due to slot 56 formed in sleeve 24 and adaptedto receive web 52 of washer 54. A similar slot 58 is formed in sleeve 28 and registers with the slot 56.

Also surrounding sleeve 24 is a tensioning member or spring washer 60 that bears against slidable washer 54. A torque means or nut 62, the internal threads of which engage external threads 26 formed on sleeve 24, bears against the surface of spring washer 60 remote from washer 54.

It readily may be appreciated that rod 40 prevents washer 54 from moving to a position at a distance from windshield 16 greater than the length of rod 40. As may be seen from FIG. 6, washer 54 is prevented from moving to the right (as viewed) by rod 40. Thus, as torque nut 62 is moved along threads 26 to the right as viewed in FIG. 6, following an initial deformation of spring washer 60, further movement of torque nut 62 to the right will result in sleeves 26 and 28 moving to the left as illustrated by the arrows 64, while torque nut 62 remains transversely stationary. Such movement of sleeve 28 urges end 30 of this sleeve towards button 32 and, due to the nonuniformity of cross section of sleeve end 38 and bearing member 36, this movement of sleeve 28 increases the frictional forces holding sleeve 28 in the illustrated position. It thus may be seen that if the moment caused by the weight of mirror 12, housing 14 and attendant structure causes a loosening of the friction coupling between sleeve 28 and bearing member 34 such that mirror 12 moves from a desired position into an objectionable position, the vehicle operator may increase the frictional forces of bearing 36—sleeve end 30 coupling by manual movement of torque nut 62.

If large adjustments of the position of mirror 12 are desired, torque nut 62 may be loosened until the frictional forces in the bearing member 36—sleeve end 30 coupling are reduced so that movement of the sleeve end relative to button 32 may be accomplished. After such an adjustment, torque nut 62 need only be tightened to maintain the mirror in the desired position. Fine adjustments of the mirror position may be accomplished by manual adjustment of the ball 20—socket housing 22 coupling.

As discussed above, movement of torque nut 62 to the right as viewed in FIG. 6 causes an initial deformation of spring washer 60 until this spring washer can no longer be deformed. In this deformed position, spring washer 60 exerts a force tending to urge washer 54 away from torque nut 62. This force tensions rod 40.

Rod 40 is constructed of frangible material. The bend in rod 40 at 42 (FIG. 3) causes a weak point in rod 40 wherein fracture of this rod will occur under certain stress conditions. Spring washer 60 is chosen so as to have a spring constant that will exert a tensioning force on rod 40 so that a fracture of this rod will occur when an impact force of a predetermined magnitude is applied to mirror 12 or housing 14. Of course, the particular spring constant of washer 60 is dictated by the desired magnitude of an impact force that will cause fracture. It readily may be appreciated that a fracture of rod 40 results in a disconnection of mirror 12 from windshield 16 since the frictional forces present at the bearing member 36—sleeve end 30 coupling easily are overcome by the impact force applied to mirror 12.

This invention thus provides a rearview mirror mounting assembly of the "double-pivot" type in that the universal couplings provided by ball 20 and housing member 22 and by bearing member 36 and sleeve end 30 allow for both fine and course adjustment, respectively, of the position of mirror 12. Furthermore, since rod 40 is constructed of frangible material, this mirror mounting assembly is of the breakaway-type. The impact force necessary to cause a fracture of rod 40 is controlled by the tension force on the rod applied by the interaction of spring washer 60 on washer 54 and torque nut 62.

We claim:

1. A mounting device for adjustably securing a rearview mirror to motor vehicle body structure, said mounting device including: an arm operatively secured to said mirror, a slidable member operatively secured to and movable longitudinally along said arm, a rod having one of its ends secured to said slidable member and the other of its ends operatively secured to said body structure, a tensioning member being positioned about and engaging said arm and being longitudinally movable to a plurality of positions along said arm, said tensioning member operatively bearing on said slidable member and urging said slidable member away from the other end of said rod to exert a tensioning force on said rod.

2. A rearview mirror mounting assembly for releasably securing a rearview mirror to motor vehicle body structure; said assembly including an arm operatively secured to said mirror; a projection secured to said body structure; said arm adapted to receive said projection in frictional engagement; and manually operative adjustment means secured to said arm and said projection and capable of urging said arm toward and away from said projection to vary the frictional forces therebetween, said adjustment means including a slidable member relatively movable along the length of said arm, a frangible rod having one of its ends secured to said projection and the other of its ends secured to said slidable member to position the latter at a predetermined distance from the former, and torque means operatively bearing on said slidable member and capable of being positioned at a plurality of locations along the length of said arm.

3. The assembly of claim 2, wherein said arm has external threads formed along at least a portion of the length thereof, said torque means comprising a nut engaging said threads and positioned between said slidable member and said projection.

4. The assembly of claim 2, wherein said rod is formed with an area having a reduced resistance to fracture at a predetermined point along its length and will break upon an impact force of predetermined magnitude being applied to said mirror.

5. The assembly of claim 2, wherein said arm has an internal passageway extending along at least a portion of the length thereof.

6. The assembly of claim 5, wherein said rod is positioned within said arm.

7. A mounting device for releasably securing a rearview mirror to motor vehicle body structure such that said mirror will break away from said structure when the mirror is subjected to a predetermined impact force, said mounting device including: an elongate arm operatively secured to said mirror, a slide member operatively secured to and movable longitudinally along said arm, an elongate frangible member having one of its ends secured to said slide member and the other of its ends operatively secured to said body structure, a tensioning member engaging said arm and movable to a plurality of positions along said arm, said tensioning member operatively bearing on said slide member and urging said slide member away from the other end of said frangible member to exert a tensioning force on said frangible member.

8. The device of claim 7, wherein said arm is formed with exterior threads thereon and supports a nut mating with said threads, said tensioning member comprising resilient means located between and bearing on said nut and said slide member.

9. The device of claim 8, wherein said resilient means comprises a spring washer.

10. The device of claim 7, wherein said frangible member is formed with a point along its length having a reduced resistance to fracture and constituting a predetermined break point.

11. The device of claim 10, wherein said break point is located proximate to said other end of said frangible member.

12. A mounting device for releasably securing a rearview mirror to motor vehicle body structure such that said mirror will break away from said structure when the mirror is subjected to a predetermined impact force, said mounting device including: an elongate arm operatively secured to said mirror, a slide member operatively secured to and relatively movable longitudinally along said arm, an elongate frangible member having one of its ends operatively secured to said structure and the other of its ends secured to said slide member and positioning said slide member at a predetermined distance from said structure. first friction means rigidly secured to said arm. second friction means operatively secured to said structure and frictionally engaging said friction means to hold said mirror in a desired position, adjustment means engaging said arm and movable relative to said arm along the length of said arm, said slide member operatively bearing on said adjustment means and limiting movement of said adjustment means away from said structure such that relative movement of said adjustment means along the length of said arm in a first direction causes said arm and said first friction means to move towards said structure and said second friction means to increase the frictional force of engagement between said first and second friction means, the frictional force of engagement between said first and second friction means and the resistance to fracture of said frangible member being such that said impact force being applied to said mirror causes said mirror to become detached from said structure.

13. The mounting device of claim 12, wherein said first friction means comprises a female member and said second friction means comprises a male member extending from said structure and received in said female member.